May 17, 1932.  E. B. MALOON  1,858,634
SCRAPER
Filed April 1, 1931  3 Sheets-Sheet 1
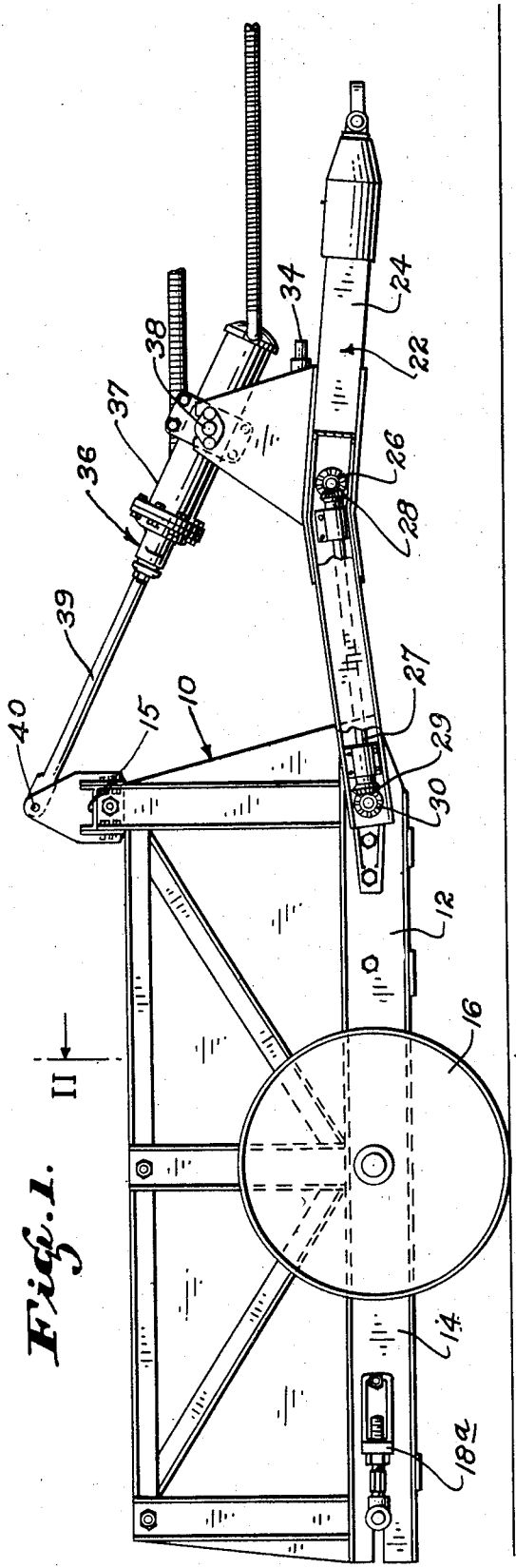
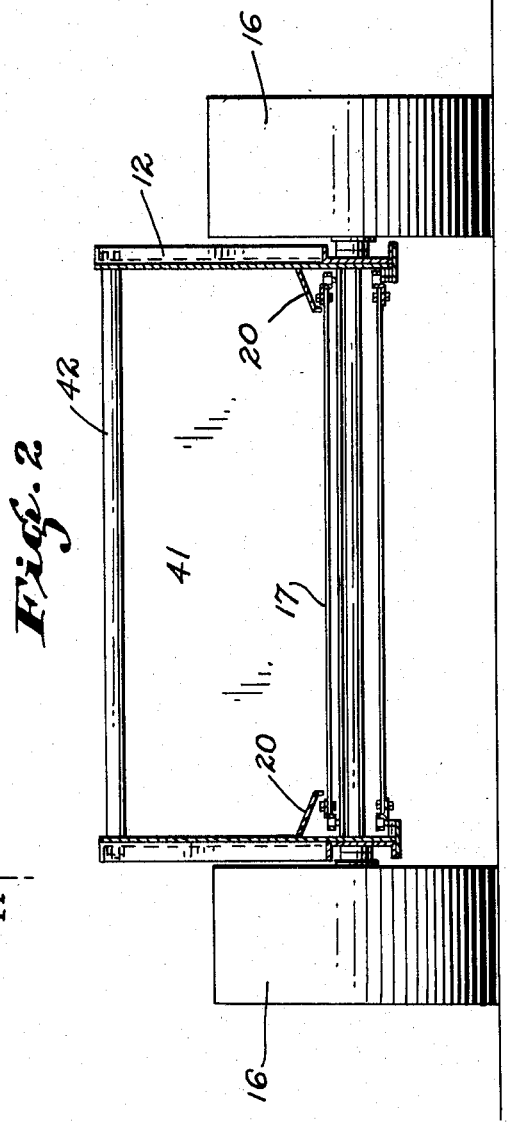
INVENTOR.
EARL B. MALOON.
BY Townsend, Loftus & Abbett
ATTORNEYS.

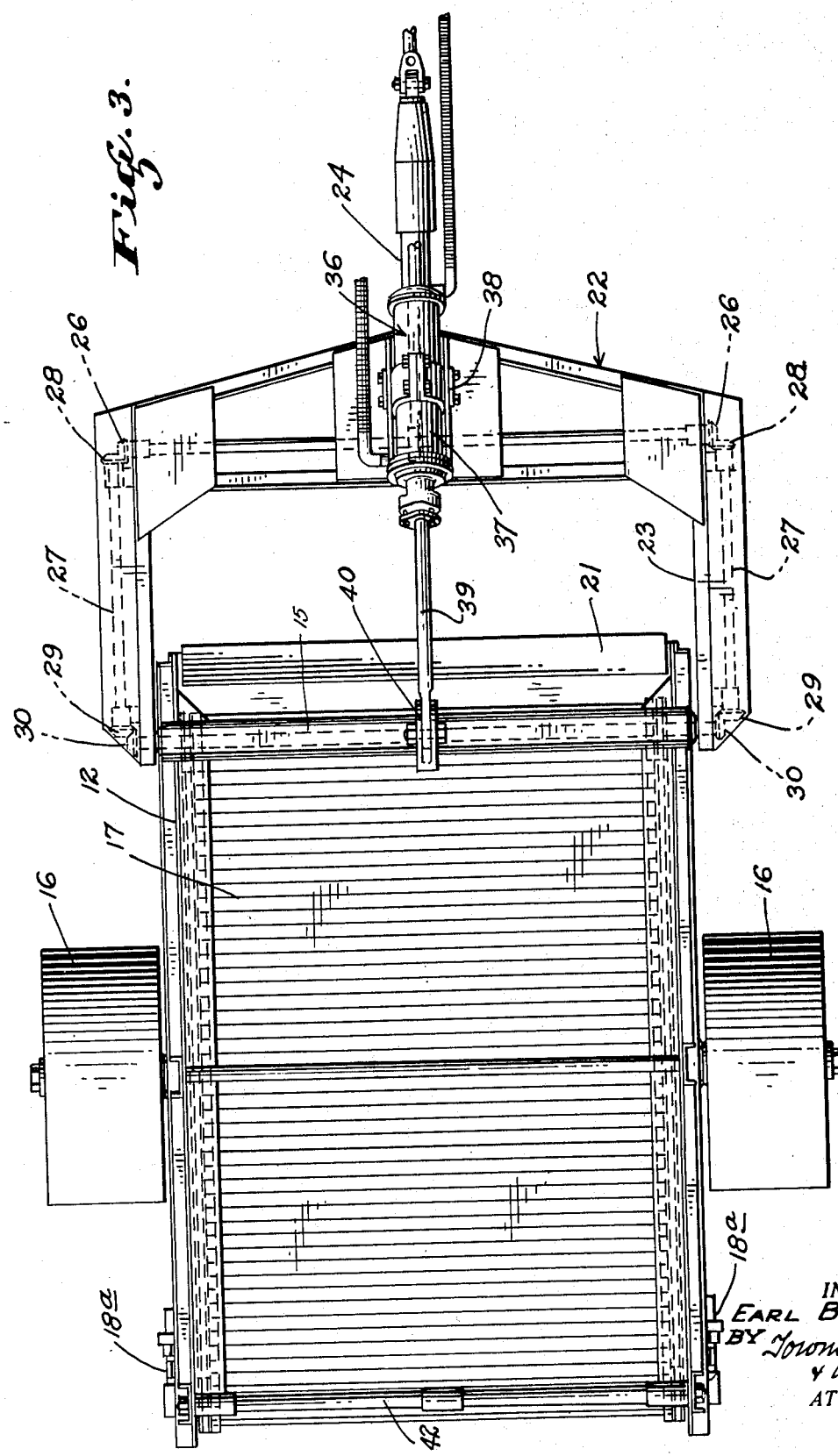

May 17, 1932. E. B. MALOON 1,858,634
SCRAPER
Filed April 1, 1931  3 Sheets-Sheet 3
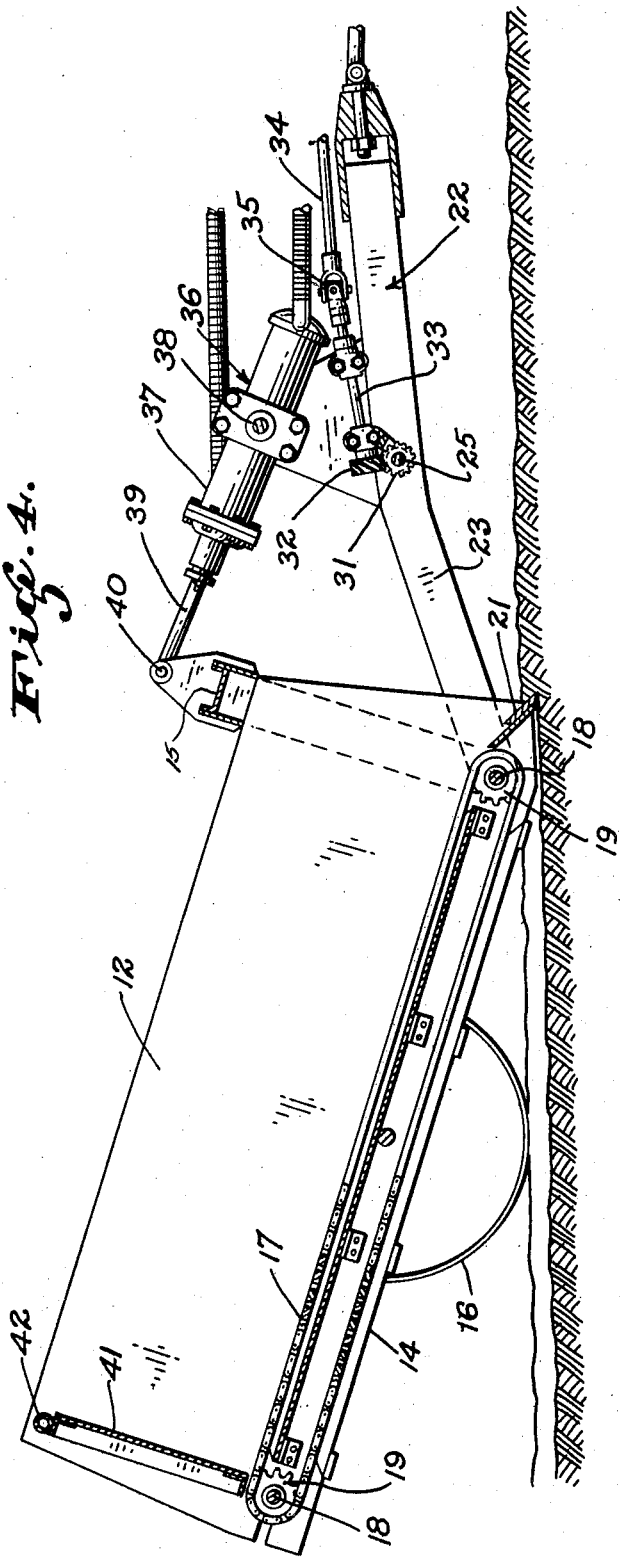
INVENTOR.
EARL B. MALOON.
BY
Townsend, Loftus & Abbett
ATTORNEYS.

Patented May 17, 1932

1,858,634

UNITED STATES PATENT OFFICE

EARL B. MALOON, OF OAKLAND, CALIFORNIA, ASSIGNOR TO AMERICAN TRACTOR EQUIPMENT COMPANY, OF OAKLAND, CALIFORNIA, A CORPORATION OF CALIFORNIA

SCRAPER

Application filed April 1, 1931. Serial No. 526,979.

This invention relates to land leveling and excavating apparatus.

It is the principal object of the present invention to provide a generally improved scraper of the carrying type which is of simple and sturdy construction and capable of being fully controlled and operated from the tractor drawing the same.

In carrying the invention into practice I provide a scraper frame supported on a pair of ground wheels and capable of pivotal movement about the axis of said wheels. At the forward end of the frame is a scraper blade cooperating with which is an endless conveyor. The upper flight of the conveyor forms the bottom of the scraper and may be driven in either direction along the line of travel directly from the tractor. A hydraulic power unit is provided for tilting the scraper in either direction about the axis of the ground wheels so that the scraper may take a cut, carry the load and discharge or distribute the same.

One form which the invention may assume is exemplified in the following description and illustrated by way of example in the accompanying drawings, in which:

Fig. 1 is a side elevation of a scraper embodying the preferred form of my invention.

Fig. 2 is a transverse sectional view therethrough taken on line II—II of Fig. 1.

Fig. 3 is a plan view of the scraper.

Fig. 4 is a view in central longitudinal section through the scraper.

Referring more particularly to the accompanying drawings, 10 indicates a scraper formed of laterally spaced side frame members 12 which include longitudinal channel bars 14. The side frames are vertically disposed and sheathed by plates to form imperforate sides for the scraper. At the forward end of the scraper the side frames are connected at the top by a transverse frame member 15. The side frames are, of course, disposed in parallelism.

Supporting the frame from the ground is a pair of ground wheels 16, the axle of which projects transversely through the channel bars 14 and is journalled in suitable bearings carried by these channel bars. The axle is positioned substantially midway between the ends of the scraper so that the scraper may be tilted in any direction about the axis of the ground wheels.

The bottom of the scraper is formed by the upper flight of an endless conveyor 17 which includes transverse shafts 18 arranged one at each end of the scraper frame and journaled in bearings carried by the longitudinal channel bars 14. At opposite ends of each of the shafts 18, the same are fitted with fixed sprockets 19, the latter being arranged closely adjacent to the inner surface of the channel bars 12, the sprockets of the shafts being in longitudinal alignment. An endless driving chain is provided at each side of the frame and led over the sprockets of the two shafts. Slats extend between the chains and are connected at their ends to the links thereof, which slats are of a width so that their adjacent edges will be in close proximity to form a substantially imperforate bottom for the scraper. The upper flight of the conveyor is, of course, horizontally disposed in parallelism with the channel bars 14. In order to take up slack and wear in the chains of the conveyor, the rearmost shaft 18 is connected with tightening devices 18a, one being mounted on each channel bar 14. The devices 18a are capable of adjustment so as to adjust the tension on the chains. Longitudinal shields 20 are arranged at the inner sides of the side frames for the protection of the chains and sprockets. This is illustrated in Fig. 2.

At the forward end of the frame is a suitable scraper blade 21 which is obliquely disposed and which extends transversely between the side frames in a position whereby when the scraper is tilted forward, it will engage the ground and take a cut, the excavated earth passing over the scraper blade unto the upper flight of the endless conveyor.

To draw the conveyor by means of a tractor, I have provided a drawbar structure generally indicated by the numeral 22. This drawbar structure comprises a yoke 23, the ends of the longitudinal arms of which are connected with the forward transverse conveyor shaft 18. This connection permits relative swinging movement in a vertical plane between the scraper frame and the drawbar. The longitudinal arms of the yoke are connected by a transverse portion. A drawbar 24 proper is connected at its rearmost end to this transverse portion of the yoke and extends forwardly whereby it may be connected with a tractor.

Arranged transversely of the scraper and adjacent to the transverse portion of the yoke 23 is a conveyor drive shaft 25 which is supported in bearings carried by the drawbar yoke 23. The ends of this shaft are fitted with fixed bevel gears 26. At each arm of the yoke is a jack shaft 27 mounted in suitable bearings carried by the arm. At one end each shaft is fitted with a bevel gear 28 in mesh with the adjacent bevel gear 26 on the drive shaft 25. At the other end each shaft 27 is fitted with a bevel gear 29 in mesh with a bevel gear 30 on the adjacent end of the transverse conveyor shaft 18.

It is obvious therefore that when a drive is transmitted to the shaft 25 that the shaft 18 will be driven and will operate the conveyor. It is intended that the conveyor be operated and controlled from the tractor and it is preferred that the conveyor be driven from the power plant of the tractor. For this purpose the tractor is fitted with an auxiliary transmission such as described and claimed in my copending application entitled Auxiliary transmission and pump for tractors, filed April 1, 1931 Ser. No. 526,978. It will suffice to state that this transmission is so connected with the drive mechanism of the tractor that it may be controlled to impart a drive to the conveyor drive shaft 25 in either direction.

For operatively connecting the drive shaft 25 with this transmission the former is provided centrally with a helical gear 31 which is in mesh with a helical gear 32 on a shaft 33 carried by the drawbar. This shaft 33 is connected to a shaft 34 through the medium of a universal joint 35. The shaft 34 leads directly to the transmission referred to. When this shaft 34 is driven in one direction, the upper flight of the conveyor will move forwardly through the intermediate drive mechanism described and when the shaft 34 is driven in the opposite direction the upper flight of the conveyor will be moved in the opposite direction.

For the purpose of tilting the frame and maintaining the same in any desired position about the axis of the ground wheels, I have provided a hydraulic power unit indicated by the numeral 36. This power unit comprises a cylinder 37 overlying the drawbar structure and arranged longitudinally thereof and pivotally supported thereon so that it may pivot in a vertical plane about an axis 38. This hydraulic cylinder is fitted interiorly with a piston which is connected with a piston rod 39 which is rearwardly directed and connected at its end to the transverse frame member 15 through the medium of a connection 40.

When the piston is moved rearwardly, the forward end of the scraper will be swung upwardly about the axis of the ground wheels and when the piston is moved forwardly, the forward end of the frame will be swung downwardly.

The delivery of fluid to the opposite ends of the cylinder and the discharge of fluid therefrom is provided through the medium of a suitable pumping apparatus which is incorporated as a part of the mechanism disclosed in my copending application previously referred to.

I desire to point out that at the rear of the scraper is a depending tail gate 41, which extends between the scraper sides and the upper edge of which is pivotally connected with a hinge bolt 42. This hinge bolt extends transversely between the side frames at the rear of the scraper frame and the mounting of the tail gate enables the latter to freely swing in either direction.

In operation of the device, it is constructed substantially as illustrated in the drawings and the drawbar 24 is connected with the tractor. At the same time the shaft 34 is placed in operative connection with the scraper driving transmission at the rear of the tractor. Further, the hydraulic power unit 36 is operatively connected with suitable pumping and control mechanism on the tractor.

If it is desired to pick up a load, the hydraulic power unit is operated to lower the forward end of the scraper until the scraper blade digs into the ground to the depth desired. A drive is then transmitted to the drive shaft 25 of the conveyor in a direction moving the upper flight of the conveyor rearwardly of the scraper. Thus, as the scraper advances, the earth moving onto the conveyor from the blade 21 will be conveyed rearwardly until the scraper is fully loaded. When this occurs, the hydraulic power unit may be operated to upraise the foward end of the scraper so as to level the conveyor so that the dirt in the scraper may be conveyed to any location desired.

If it is merely desired to discharge the dirt at one particular point, the tractor may be held stationary and the shaft 25 operated in a direction to move the upper flight of the conveyor rearwardly and discharge the load through the tail gate 41. However, by simultaneously moving the scraper forwardly, the load may be distributed over any particular area by regulating the forward speed of the scraper as the upper flight of the conveyor discharges the load at the rear of the scraper.

However, if it is desired to spread the load at an even thickness, the forward end of the scraper may be lowered until the cutting edge of the scraper blade 21 is at a distance from the ground equal to the thickness it is desired to spread the load. The scraper is then held in this position by the power unit 36 and the conveyor is operated through the medium of the shaft 25 so that its upper flight will move forwardly of the scraper, discharging the load over the scraper blade 21. As the scraper is drawn forwardly, the blade 21 will insure that the load will be evenly distributed to the desired depth.

From the foregoing it is obvious that I have provided a generally improved scraper which is capable of picking up a load rapidly, conveying the same to any particular location and evenly spreading the load over a desired area.

It is also desired to point out that the scraper may be operated and fully controlled from the tractor and derives its power for operation from the tractor.

While I have shown the preferred form of my invention, it is to be understood that various changes may be made therein by those skilled in the art without departing from the spirit of the invention as defined in the appended claims.

Having thus described my invention, what I claim and desire to secure by Letters Patent is:

1. A scraper of the character described comprising a pair of side frames, a transverse frame member arranged at the forward end of the side frames at the top thereof, a transverse conveyor shaft arranged at each end of the scraper and extending transversely between the side frames and journalled therein, a conveyor carried by said shafts, a pair of ground engaging members disposed one at the outside of each of the side frame members, an axle for said ground engaging members extending transversely of the frame at a point substantially midway between the forward and rear ends thereof, a drawbar structure having a yoke portion pivotally connected to the side frames at the forward ends thereof, said connection enabling relative vertically swinging movement between the side frames and the drawbar structure, a hydraulic cylinder pivotally mounted on the drawbar structure, a piston in said cylinder, a piston rod connected to the piston, a connection between said piston rod and said transverse frame member whereby reciprocation of the piston will oscillate the forward end of said scraper vertically.

2. A scraper of the character described comprising a pair of side frames, a transverse frame member arranged at the forward end of the side frames at the top thereof, a transverse conveyor shaft arranged at each end of the scraper and extending transversely between the side frames and journalled therein, a conveyor carried by said shafts, a pair of ground wheels disposed one at the outside of each of the side frame members, an axle for said ground wheels extending transversely of the frame at a point substantially midway between the forward and rear ends thereof, a drawbar structure having a yoke portion pivotally connected to the side frames at the forward ends thereof, said connection enabling relative vertically swinging movement between the side frames and the drawbar structure, a drive shaft arranged transversely of the drawbar structure and adapted to be driven in either direction from the tractor, a bevel gear at each end of the shaft, longitudinal shafts carried by the drawbar structure, intermeshing bevel gears at the rear ends of said longitudinal shafts and on the ends of the foremost conveyor shaft, bevel gears at the forward end of said longitudinal shafts in mesh with the bevel gears on the drive shaft whereby operation of said drive shaft will operate said conveyor.

3. A scraper of the character described comprising a pair of side frames, a transverse frame member arranged at the forward end of the side frames at the top thereof, a transverse conveyor shaft arranged at each end of the scraper and extending transversely between the side frames and journalled therein, a conveyor carried by said shafts, a pair of ground wheels disposed one at the outside of each of the side frame members, an axle for said ground wheels extending transversely of the frame at a point subsantially midway between the forward and rear ends thereof, a drawbar structure having a yoke portion pivotally connected to the side frames at the forward ends thereof, said connection enabling relative vertically swinging movement between the side frames and the drawbar structure, a drive shaft arranged transversely of the drawbar structure and adapted to be driven in either direction from the tractor, a bevel gear at each end of the shaft, longitudinal shafts carried by the drawbar structure, intermeshing bevel gears at the rear ends of said longitudinal shafts and on the ends of the foremost conveyor shaft, bevel gears at the forward end of said longitudinal shafts in mesh with the bevel gears on the drive shaft whereby operation of said drive shaft will operate said conveyor, a hydraulic cylinder arranged longitudinally of the drawbar structure and overlying the same and pivotally supported on the drawbar structure, a piston in said cylinder, a piston rod connected with said piston and projecting rearwardly, the rearmost end of said piston rod being connected with said transverse frame member whereby reciprocation of the piston will cause oscillation of the scraper about the axis of the ground wheels.

EARL B. MALOON.